United States Patent [19]

Stenton et al.

[11] Patent Number: 5,796,488
[45] Date of Patent: Aug. 18, 1998

[54] OPTICAL TARGET ALIGNMENT AND TECHNIQUE

[75] Inventors: Conrad Stenton, Midland, Canada; Melvin Francis, Tigard, Oreg.

[73] Assignee: Hughes Electronics, Los Angeles, Calif.

[21] Appl. No.: 608,907

[22] Filed: Feb. 29, 1996

[51] Int. Cl.[6] .................................................. G01B 11/00
[52] U.S. Cl. ........................ 356/399; 356/375; 356/138; 356/146
[58] Field of Search ............................. 315/375, 399, 315/400, 401, 138, 146

[56] References Cited

U.S. PATENT DOCUMENTS 3,446,560  5/1969  Braisier .................................. 356/146
4,907,881  3/1990  Jones ..................................... 356/399
5,400,133  3/1995  Hinton et al. .......................... 356/138

Primary Examiner—Frank Gonzalez
Assistant Examiner—Reginald A. Ratliff
Attorney, Agent, or Firm—Michael W. Sales; Wanda K. Denson-Low

[57] ABSTRACT

The invention resides in a method of measuring position and angle comprising the steps of providing a tooling telescope, a transparent target surface and an alignment target having a light reflecting face confronting the telescope. The light reflecting face being defined by a recess having a parabolic surface and a flat surface surrounding the parabolic recess. The method further includes using light reflected off the flat surface to create collimated light passing through the target surface to define an angle of measurement of the tooling telescope and using light reflected off the parabolic surface to focus a point on the transparent target surface to measure position.

19 Claims, 1 Drawing Sheet

ı

OPTICAL TARGET ALIGNMENT AND TECHNIQUE

BACKGROUND OF THE INVENTION

The present invention relates to an apparatus and method of providing simultaneous measurement of perpendicularity and position when measured with an alignment tooling telescope.

The aligning of an instrument relative to a target in space in order to affect measurement of perpendicularity and position so that the access of the telescope can be accurately determined in space, has previously required the use of two targets to affect such measurement. The first such target was a flat mirror for measuring at infinity and the other such target was focused to a finite distance. As illustrated in FIG. 1, the device used for affecting measurements of perpendicularity involves using an autocollimator 1 which is used to focus light from a flat mirror 4. The angle of measurement A being determinative of the perpendicularity to be achieved. Additionally, alignment with a given point is usually accomplished by using an alignment telescope 6 having an optical axis OA focused to a single point P as illustrated by the crossing lines 10 in FIG. 2. Therefore, the prior art process involves using an autocollimator device and an alignment telescope to determine a position in space for a given axis line. This prior art process also could include the combining of the autocollimator device so that the autocollimator shares the pupil with the alignment telescope. Even in this scenario, it is nevertheless required to use two separate targets, one dedicated for measurement at infinity e.g., a flat mirror, and another dedicated to define a point located at a finite distance, e.g., crossing lines which create a point in space.

Accordingly, it is an object of the invention to provide a novel and unobvious apparatus and related method for simultaneous measurement of perpendicularity and position of an access in space without the need of using multiple targets to affect such measurements.

It is still a further object of the invention to provide a target of the aforesaid type which is readily commercially available and is of a low cost.

SUMMARY OF THE INVENTION

The invention resides in a method of measuring position and angle comprising the steps of providing a tooling telescope having an optical axis extending generally along its longitudinal extent and having a first end associated with an ocular means and a second end associated with a light collecting opening for permitting light passage through into the telescope. The invention further includes providing a transparent target surface and disposing the transparent target surface at the second end of the telescope and securing it against movement relative to the telescope second end. An alignment target is also provided having a light reflecting face confronting the second end of the telescope, the light reflecting face being defined by a recess having a parabolic surface and a flat surface surrounding the parabolic recess. The method further includes using light reflected off the flat surface to create collimated light passing through the target surface to define an angle of measurement of the tooling telescope and using light reflected off the parabolic surface to focus a point on the transparent target surface to measure position.

DETAILED DESCRIPTION OF THE PREFERRED EMBODIMENTS

Figure 1:
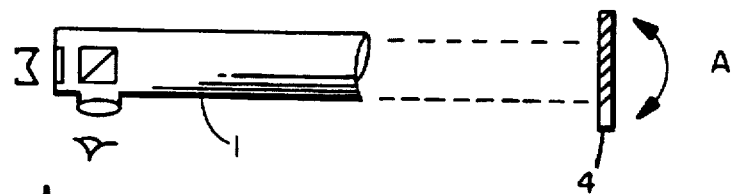
FIG. 1 illustrates a prior art measuring device.
Figure 2:
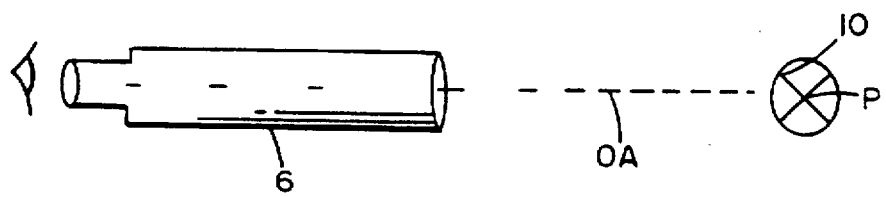
FIG. 2 illustrates another prior art measuring device.
Figure 3:
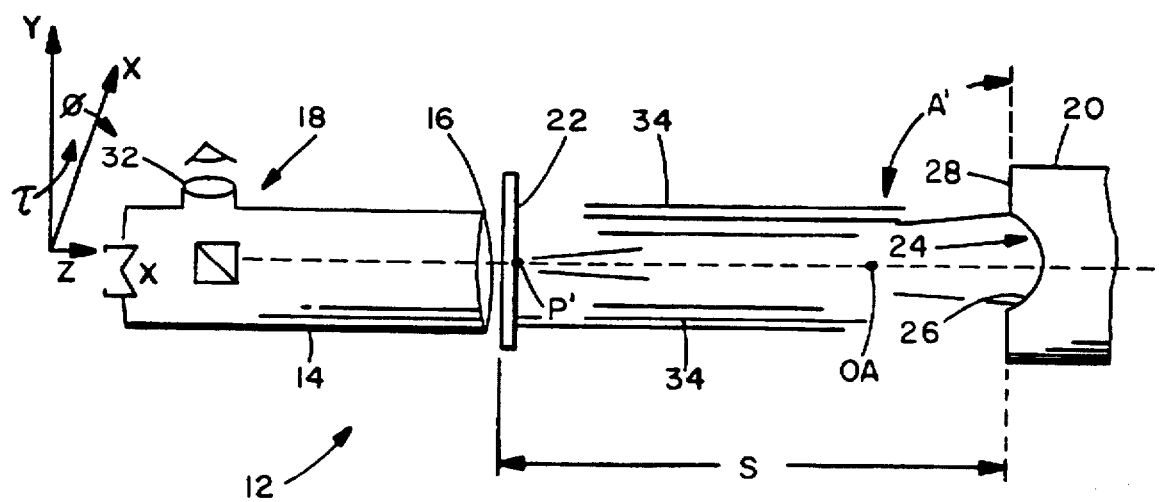
FIG. 3 is a schematic view showing the system which embodies the present invention.

Referring now to FIG. 3, a method for the simultaneous measurement of perpendicularity and position is shown by the system 12. The method is practiced by providing a standard commercially available tooling telescope 14 having an optical axis OA and an ocular lens means 18 at one end thereof and having a light receiving end 16 along the optical axis OA. The method further employs a commercially available alignment target 20 which is located in line with the optical axis OA of the tooling telescope 14. An autoreflex target 22 is provided and is secured against movement relative to the light receiving end 16 of the tooling telescope so as to be interposed between the end 16 and the alignment target 20 and in line with the optical axis OA of the tooling telescope. In the preferred embodiment, the autoreflex target 22 is a transparent substrate.

The autoreflex target 22 and the tooling telescope are together fixed in space by an appropriate mounting system which secures the two members relative together to x, y, z axes and the ϕ, τ rotational directions. Also, the mounting system (not shown) is responsible for adjustably mounting the autoreflex target 22 and the tooling telescope 14 together in space so as to provide an adjustment platform for the adjustment and securement of the telescope and the autoreflex target 22 together along the indicated x, y, z axes and the ϕ and τ tilt and tip directions.

The alignment target 20 is a one piece member defined by a light reflecting front face 24 which includes a parabolic recess 26 having a center which is located coincidentally with the optical axis OA of the telescope when the tooling telescope and the autoreflex target 22 are aligned in accordance with the practice of the present invention. Surrounding the parabolic recess 26 in the face 24 is a highly flat surface 28 which surrounds the parabolic recess 26 and which flat surface 28 is perpendicularly disposed relative to the optical axis OA of the tooling telescope when the alignment target is properly aligned with the target 22.

The autoreflex target 22 is located at a spaced distance S from the flat surface 28 of the alignment target 20 so that the light which is reflected back toward the tooling telescope from the surface of the parabolic recess 26 is focused at a single point P' on the autoreflex target while light reflected back from the flat surface 28 is collimated and passes through the target 22 and into the tooling telescope 6. The ocular lens means 18 is used to view both the point P' and the collimated light 34 through an eye piece 32 which is standard in the industry and provides a shared pupil for measurements of angle and position.

Using the collimated light 34, a measurement of angle can be obtained as any positional errors translate to angle A' and by moving the tooling telescope along its optical axis OA to adjust the focal length of the parabolic recess 26 the sensitivity or position can be adjusted.

Accordingly, the invention has been described the way of illustration rather than limitation.

What is claimed is:

1. A method of measuring position and angle comprising:

providing a tooling telescope having an optical axis extending generally along its longitudinal extent and having a first end associated with an ocular means and a second end associated with a light collecting opening for permitting light passage through said telescope;

providing a transparent target surface and disposing said transparent target surface at said second end of said telescope and securing it against movement relative to said telescope second end;

providing an alignment target having a light reflecting face confronting said second end of said telescope, said light reflecting face being defined by a recess having a parabolic surface and a flat surface surrounding said parabolic recess; and using light reflected off said flat surface to create collimated light passing through said target surface to define an angle of measurement of said tooling telescope and using light reflected off said parabolic surface to focus a point on said transparent target surface to measure position.

2. A method as defined in claim 1 further characterized by providing said tooling telescope ocular means at said first end thereof with a shared pupil for determining angle measurement and position of light reflected from said alignment target.

3. A method as defined in claim 2 further characterized by moving the tooling telescope in a direction parallel to the optical axis to adjust the focal length of the light reflected by said parabolic recess surface to affect sensitivity of the measurement.

4. A method as defined in claim 3 further characterized by measuring of both angle and position simultaneously using a shared pupil.

5. A method as defined in claim 4 wherein the step of measuring of both angle and position simultaneously further comprises determining coordinates in x, y, and z reference axes to determine tip and tilt of said telescope about axes x and y.

6. A method as defined in claim 1 further characterized by removably mounting the tooling telescope to a base to effect measurement in five degrees of freedom.

7. A method as defined in claim 6 further characterized by providing said alignment target as an one piece member.

8. A method of measuring position and angle comprising:

passing light through an ocular element of a first longitudinal end of a tooling telescope having an optical axis extending generally along its longitudinal extent;

passing said light through a light collecting opening of a second longitudinal end of said telescope;

creating collimated light by reflecting said light off a flat surface of a light reflecting face of an alignment target, said light reflecting face confronting said second end of said telescope, said light reflecting face being defined by a recess having a parabolic surface and said flat surface surrounding said parabolic recess;

passing said collimated light through a transparent target surface disposed at said second end of said telescope and secured against movement relative to said telescope second end to define an angle of measurement of said tooling telescope; and using light reflected off said parabolic surface to focus a point on said transparent target surface to measure position.

9. A method as defined in claim 8 wherein said step of passing light through said tooling telescope ocular element at said first end thereof comprises passing light through a shared pupil for determining angle measurement and position of light reflected from said alignment target.

10. A method as defined in claim 9 further characterized by moving the tooling telescope in a direction parallel to the optical axis to adjust the focal length of the light reflected by said parabolic recess surface to affect sensitivity of the measurement.

11. A method as defined in claim 9 further characterized by measuring of both angle and position simultaneously using said shared pupil.

12. A method as defined in claim 11 wherein the step of measuring of both angle and position simultaneously further comprises determining coordinates in x, y, and z reference axes to determine tip and tilt of said telescope about axes x and y.

13. A method as defined in claim 8 wherein said alignment target is a one piece member.

14. An optical system for measuring position and angle comprising:

a tooling telescope having an optical axis extending generally along its longitudinal extent and having a first end associated with an ocular element and a second end associated with a light collecting opening for permitting light passage through said telescope;

a transparent target surface disposed at said second end of said telescope and secured against movement relative to said telescope second end;

an alignment target having a light reflecting face confronting said second end of said telescope, said light reflecting face being defined by a recess having a parabolic surface and a flat surface surrounding said parabolic recess; wherein light reflected off said flat surface of said alignment target creates collimated light passing through said target surface to define an angle of measurement of said tooling telescope and light reflected off said parabolic surface of said alignment target focuses at a point on said transparent target surface to measure position.

15. A system as defined in claim 14 wherein said tooling telescope ocular element at said first end thereof comprises a shared pupil for determining angle measurement and position of light reflected from said alignment target.

16. A system as defined in claim 15 wherein said tooling telescope is movable in a direction parallel to the optical axis to adjust the focal length of the light reflected by said parabolic recess surface to affect sensitivity of the measurement.

17. A system as defined in claim 14 wherein said tooling telescope ocular element at said first end thereof comprises a shared pupil for simultaneously determining angle measurement and position of light reflected from said alignment target.

18. A system as defined in claim 14 wherein said tooling telescope is removably mounted to a base to effect measurement in five degrees of freedom.

19. A system as defined in claim 14 wherein said alignment target is a one piece member.

* * * * *